United States Patent [19]

Tajima et al.

[11] Patent Number: 4,652,194
[45] Date of Patent: Mar. 24, 1987

[54] ANCHOR BOLT

[75] Inventors: Shoichi Tajima, Kitasumiya; Kouji Fujiwara, Shinke-nishimachi, both of Japan

[73] Assignee: Fujibyora Co., Ltd., Osaka, Japan

[21] Appl. No.: 783,663

[22] Filed: Oct. 3, 1985

[30] Foreign Application Priority Data

Nov. 26, 1984 [JP] Japan ................................ 59-249260

[51] Int. Cl.$^4$ ............................................. F16B 35/04
[52] U.S. Cl. ..................................................... 411/417
[58] Field of Search ............................... 411/411–424, 411/311, 376

[56] References Cited

U.S. PATENT DOCUMENTS

| | | | |
|---|---|---|---|
| 3,937,119 | 2/1976 | Ernst | 411/422 |
| 4,439,077 | 3/1984 | Godsted | 411/412 |
| 4,544,313 | 10/1985 | Grossberndt | 411/424 |

FOREIGN PATENT DOCUMENTS

| | | | |
|---|---|---|---|
| 2500090 | 8/1982 | France | 411/411 |
| 508867 | 7/1939 | United Kingdom | 411/411 |

Primary Examiner—James L. Ridgill, Jr.
Attorney, Agent, or Firm—Sixbey, Friedman & Leedom

[57] ABSTRACT

An anchor bolt consisting of a shank screwed into a bore in a structural body made of concrete etc. having a screw thread with notches, and a root of thread between the screw thread. The entering flank and the trailing flank of the screw thread are defined by respective angles of inclination $\alpha$ and $\beta$ formed therefrom to the axis of the shank, the angle $\beta$ being smaller than the angle $\alpha$. The root of screw is constituted by a carrying portion formed immediately after the trailing flank toward the unscrewing direction, and a tapered surface formed from the carrying portion to the root portion of the entering flank of the following screw thread, gradually increasing in diameter theretoward.

10 Claims, 8 Drawing Figures

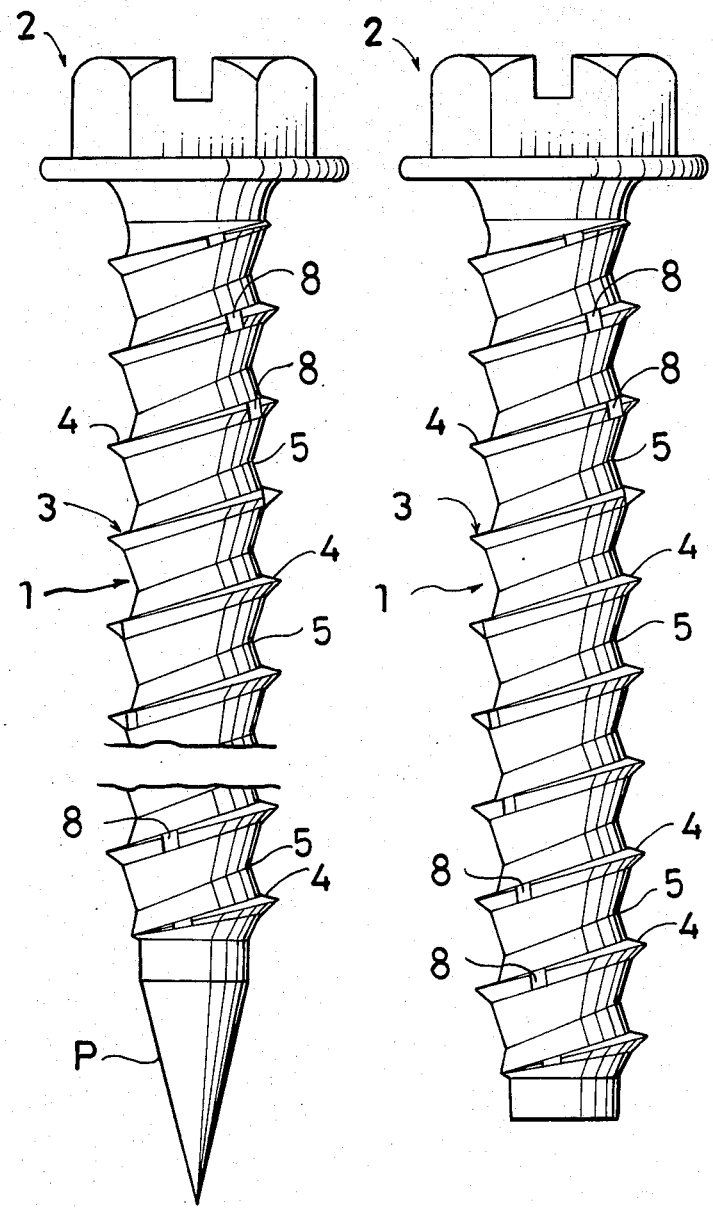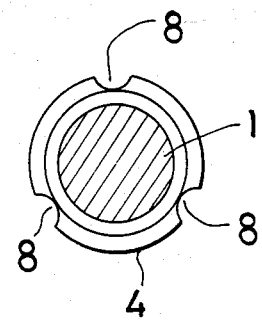

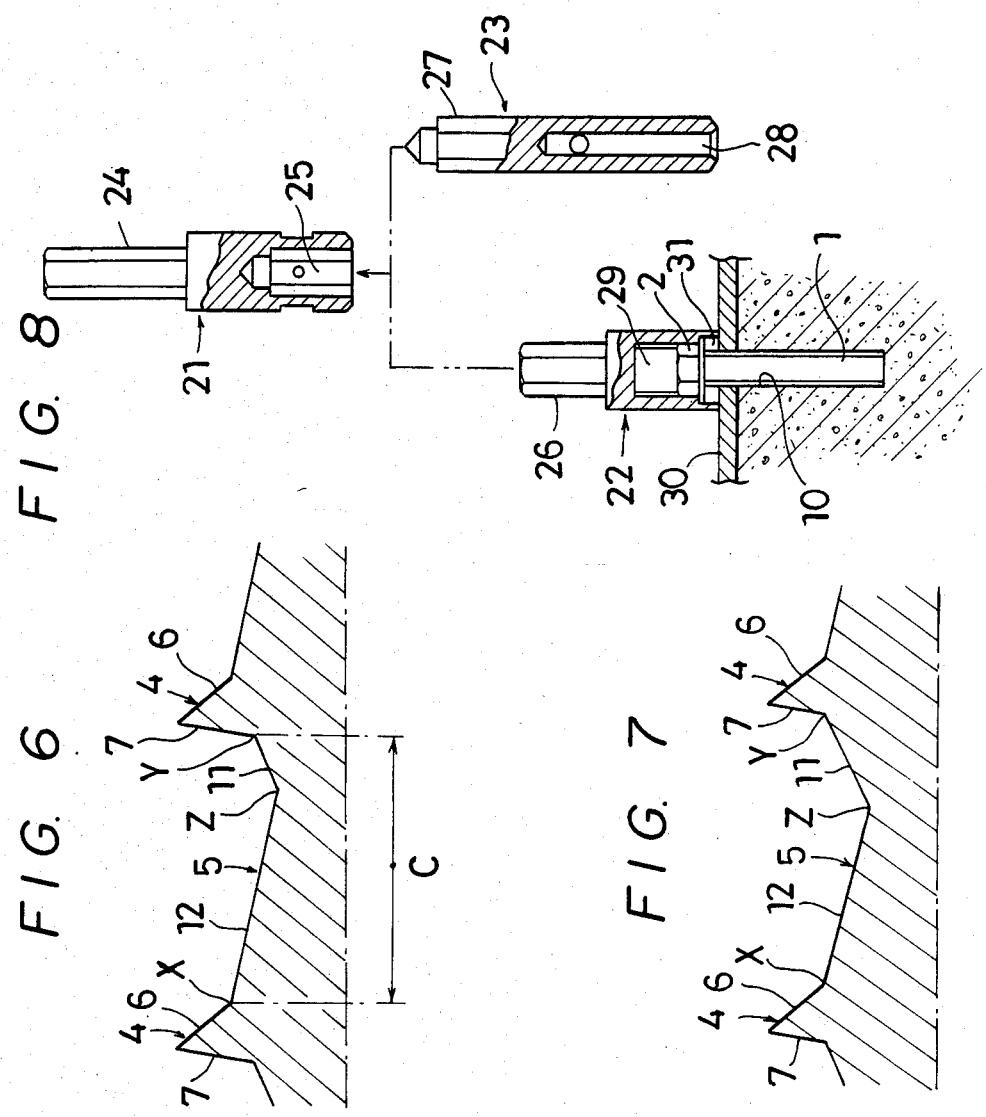

ANCHOR BOLT

BACKGROUND OF THE INVENTION

The present invention relates to an anchor bolt and more particularly to an anchor bolt for fixing various members such as an angle bar etc. to a wall of a structure made of concrete, for example.

A prior art for the anchor bolt has been disclosed in U.S. Pat. No. 3,937,119 (U.S. Pat. Ser. No. 535,536 Dec. 23, 1974).

The anchor bolt of this prior art has a head portion and a shank which is provided with a pair of threads consisting of a guide thread and a tapping thread. The crest diameter of the guide thread is set almost equal to the inside diameter of a bore provided in a structural body. The crest diameter of the tapping thread is set larger than the inside diameter of the bore. The tapping thread is provided with a plurality of notches.

When this anchor bolt is screwed into the bore, the guide thread smoothly leads the shank without causing the axis of the shank to shift from the screwing direction, and an amount of material is broken off by the notches of the tapping thread from the structural body and filled into the space around the root of thread so that the shank is firmly embedded in the structural body.

The superiority of the anchor bolt in the above prior art stems from the idea of filling the space between the anchor bolt and the inner surface of the bore with the amount of material broken off by the notches. However, it is not so pull-out resistant to being pulled out after it is embeding as was intended.

In the arrangement of this prior art, both the root portions of the guide thread and the tapping thread are so much smaller in diameter compared to the inside diameter of the bore that large spaces are formed between each of the root portions of the threads and the inside wall of the bore. Accordingly, it is not possible for these spaces to be completely and tightly charged with particles of the material. Additionally, in this prior art, as the flanks of the crest of the tapping thread has flanks configure a pair of equal legs in a section thereof, it is understood that the arrangement has been made without consideration of the strength of the screw thread and consequent improvement in the resistance to being pulled out.

SUMMARY OF THE INVENTION

An anchor bolt according to the invention comprises a shank screwed into a bore formed in a structural body made of concrete etc., a head portion for rotating the shank, a screw portion provided along the shank and a screw thread as an constituent thereof, having an entering flank facing toward the screwing direction and plurality of notches on a crest of the screw thread. This configuration is similar to the prior art publicly known, but the present invention provides various features which are distinct from those of the prior art.

It is a primary object of the present invention to provide an anchor bolt characterized in that the crest diameter of the screw thread is larger than an inside diameter of the bore, and the screw thread is provided with an entering flank defind by an angle of inclination $\alpha$ formed therefrom to an axis and a trailing flank defined by an angle of inclination $\beta$ formed therefrom to the axis of the shank, the angles of inclination $\alpha$ and $\beta$ assuming a relation: $\alpha > \beta$. Thus, the trailing flank of the screw thread improves the pull-out resistance to the structural body.

The second object of the invention is to provide an anchor bolt characterized in that the root of the thread provided along the shank between the adjacent screw threads with notches is provided with a carrying portion formed in a position immediately adjacent to the trailing flank toward the unscrewing direction and with a diameter smaller than the inside diameter of the bore, and a tapered surface formed from the carrying portion to the root portion of the entering flank of a follwing screw thread, which gradually increasing in diameter. Accordingly, particles of material scraped off by the notches are readily recieved by the carrying portion and pushed outwardly along the tapered surface, as the shank is screwed into the bore. Thus, the particles tightly charged in the space between the inner surface of the bore and the tapered surface perform a wedging action, whereby the shank is firmly combined with the bore.

Other objects of the invention will be apparent in the following detailed descriptions with reference to the appended drawings.

BRIEF DESCRIPTION OF THE DRAWINGS

FIG. 1 is a front elevation of an anchor bolt as an embodiment according to the invention;

FIG. 2 is a transverse cross section of the same;

FIG. 3 is a front elevation of an embodiment comprising an acute point;

FIG. 6 is an expanded sectional view of the second embodiment showing an essential part thereof FIG. 7 is an expanded sectional view of the third embodiment showing an essential part thereof; and, FIG. 8 is an exploded sectional view showing an applied tool.

DESCRIPTION OF THE PREFERRED EMBODIMENTS

(First embodiment)

In FIG. 1, an anchor bolt is provided with a shank 1 having a screw portion 3 and a head portion 2 for rotating the shank. The screw portion may have a plurality of helical threads as far as it is applied in accordance with the object of the invention, while it is exemplified as a single thread screw in the figures. The entering extremity of the anchor bolt is preferably formed into an acute point P such as shown in FIG. 3 with an included angle: about 30° to constitute a pilot end toward a bore into which the anchor bolt is screwed. The entering extremity, however, can be formed into a dull point as shown in FIG. 1.

Figure 4:
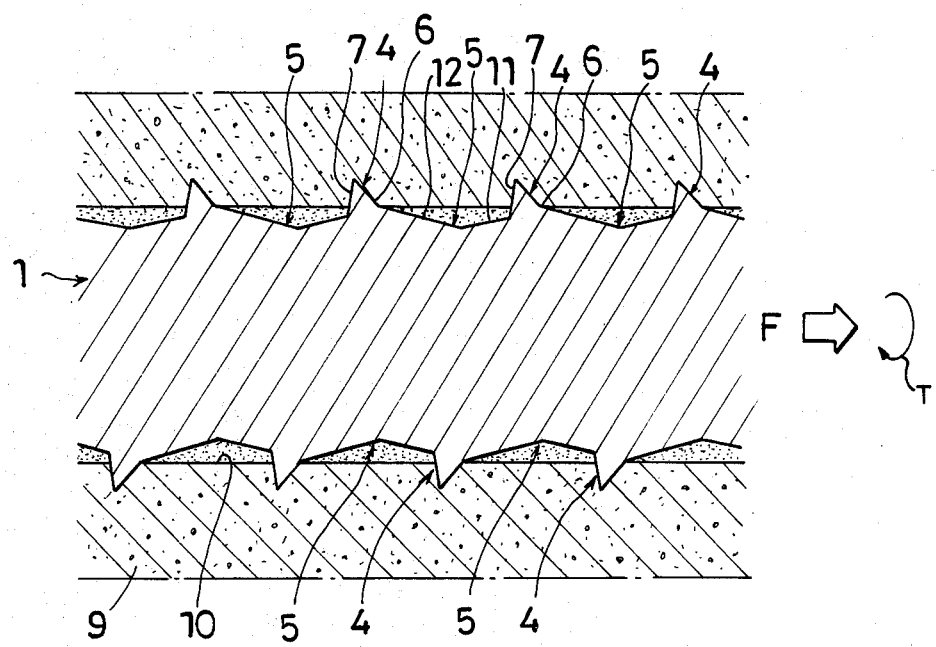
FIG. 4 is a longitudinal section of the first embodiment showing an essential part thereof.
Figure 5:
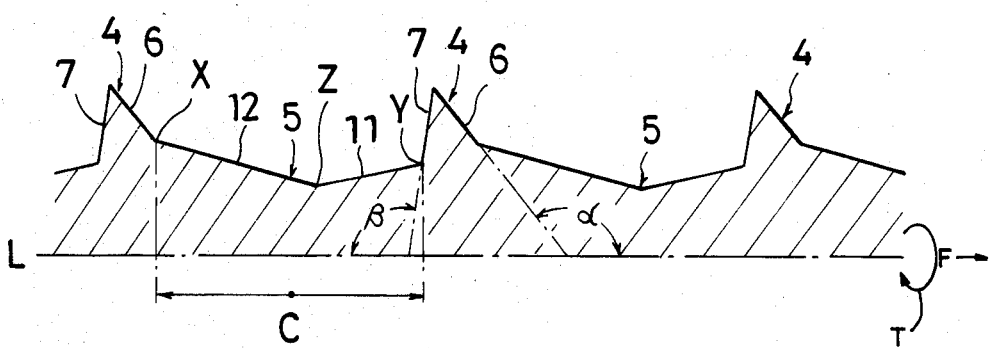
FIG. 5 is an expanded sectional view of the same.

The screw portion 3 includes a screw thread 4 and a root 5 of the thread. The screw thread 4 is provided with an entering flank 6 facing toward the direction F in which the shank is screwed when bolt 1 is turned in threading direction and a trailing flank 7 facing toward the reverse direction in which the shank is unscrewed, as shown in FIG. 4 and 5.

A plurality of notches 8 are provided on the screw thread 4 at intervals, which scrape off a material from the structural body 9, composed of concrete, blocks or brick, when the shank is screwed into a bore 10 bored in the structural body 9.

The screw thread 4 has a crest diameter which is larger than the inside diameter of the bore 10, the entering flank 6 and the trailing flank 7 relating to the screwing direction F. The entering flank 6 is defined by its angle of inclination $\alpha$ formed therefrom to a line L which is parallel to an axis of the shank. The trailing flank 7 positioned on the opposite side is defined by its angle of inclination $\beta$ formed therefrom to the line L. These angles of inclination of the flanks assume the relation $\alpha > \beta$, as shown in FIG. 5, where preferably $\alpha =$ approx. 140° and $\beta =$ approx. 105°. That is, a pair of the flanks form unequal legs, in a cross section of the screw thread. Accordingly, the angle of inclination $\beta$ of the trailing flank 7 is set at a relatively small angle and most suitably at 90 degrees such as to maximize a pull-out resistance to the structural body 9 into which the shank 1 is screwed by tapping. On the one hand, as the angle of inclination $\beta$ of a trailing flank 7 is minimized, the screw thread 4 is reduced in thickness. However, the general thickness of the screw thread is retained by enlarging the angle of inclination $\alpha$ of the entering flank 6, as in the above, and the strength of the screw thread is maintained.

The above notches 8 are provided plurally on the screw thread 4 at equal intervals, and each of the notches is formed into a shallow U-shape and arranged such that the bottom of the notch reaches to a root portion X of the entering flank 6.

The root 5 of thread is positioned between two rows of the screw thread 4 and forms a constricted portion having a shallow V-shaped section such as shown in FIG. 5 and including a carrying portion 11 and tapered surface 12. The carrying portion 11 is formed in a position immediately adjacent to a root portion Y of the trailing flank 7 toward the reverse direction relating to the screwing direction F, thus forming a tapered surface gradually reducing in diameter from a size less than the diameter of the bore 10. In the embodiment shown in the figures, the diameter of the root portion Y of the trailing flank 7 and the carrying portion 11 are smaller than the inside diameter of the bore 10. The tapered surface 12 extends from the carrying portion 11 in the reverse direction relating to the screwing direction F to a root portion X of the entering flank 6 in a following row of the screw thread, increasing in diameter thereto ward. As embodied in the figures, the tapered surface 12 and the following entering flank 6 meet in a point of intersection X which corresponds to the inside diameter of the bore 10 and defines a guide for the shank 1.

At the point of intersection Z of the carrying portion 11 and the tapered surface 12, the shank 1 has the narrowest diameter. In this embodiment, the point of intersection Z is located in a position somewhat biased from the middle point C between the root portion Y and X, toward the screwing direction F.

Additionally, in the most suitable form of the embodiment according to the invention, the anchor bolt has following dimentions:
crest diameter of the screw thread
 . . . 6.35 (approx. 0.25 in.);
outside diameter at the intersection Z in the root of thread
 . . . 4.1 (approx. 0.161 in.);
length of the shank
 . . . 32 (approx. 1.26 in.);
pitch of the screw
 . . . 8/in.; and
inside diameter of the bore
 . . . 5.1 (approx. 0.20 in.).

(Second embodiment)

FIG. 6 shows the second embodiment according to the present invention, in which the point of intersection Z of the carrying portion 11 and the tapered surface 12 is located in a position considerably biased from the middle point C of the root portions Y and X, toward the screwing direction F (located nearer to the root portion Y than that of the above case in FIG. 5). Other features are similar to those of the first embodiment. The arrangement of this embodiment is particularly effective when the amount of material scraped off is small, as the depth of the screw thread 4 or the notch is shallow.

(Third embodiment)

FIG. 7 shows the third embodiment according to the present invention, in which both the root portion Y of the trailing flank 7 and the root portion X of the entering flank 6 corresepond to the inside diameter of the bore 10. Other features are similar to those of the first embodiment. According to the arrangement of this embodiment, a pair of the root portions X and Y of the flanks 6 and 7 coincidentally acts as guide for the shank 1 screwed into the bore. Consequently, it is possible for the shank 1 to be more smoothly screwed without misalignments of the axes of the shank and the bore.

(Action)

The anchor bolt according to the present invention is screwed into a bore 10 bored in the structural body 9 by, for example, a drill means, in the conventional manner of screwing.

In screwing the shank 1, the bore 10 is tapped by the screw thread 4, and the material of the structural body 9 is scraped off by the notches 8. As the shank is inserted by screwing into the structural body 9 in the direction of the arrow F (shown in FIG. 4), particles of the material scraped off are, at first, suitably held by the carrying portion 11 and successively, with the progression of screwing and the accumulation of the particles of the material, placed on the tapered surface 12, and fill up in the narrow space defined by the tapered surface 12 and the bore 10, thereby forming a wedge-shape and tightly combining. Accordingly, the shank 1 is firmly fixed to the structural body 9 by virtue of the particles of the material compressed and combined between the tapered surface 12 and the inner surface of the bore.

Additionally, in screwing the shank, the root portion X of the entering flank 6 at least corresponds to the inside diameter of the bore 10 so as to prevent the shank 1 from shifting the axis thereof and ensure a smooth screwing of the shank 1.

After the shank 1 is embedded, its pull-out resistance is increased by virture of the engagement between the structural body 9 and the trailing flank 7 of the screw thread 4 defined by the small angle of inclination $\beta$, as well as by the above wedging action.

It is a matter of course that the present invention is not limited within the above embodiments, the carrying portion 11 and the tapered surface 12, or at least one of them can take the form of arced, convex surfaces, while they are embodied in the figures as flat surfaces intersecting at point Z.

(Tool for screwing the anchor bolt)

FIG. 8 shows a tool which is suitable for effective usage of the anchor bolt according to the present invention. The tool includes a main adapter 21, socket wrench 22 and drill adapter 23. The main adapter 21 has a shaft 24 for insertion into the chuck of a driving shaft of an electric motor tool etc. and an inlet portion 25 forming a hexagon socket head into which a shaft 26 of the socket wrench 22 and a shaft 27 of the drill adapter 23 are alternatively and detachably inserted. A drill bit (not shown) is detachably inserted into in a inlet portion 28 of the drill adapter 23, whereby the bore 10 is provided in the structural body 9.

When the tool is used in screwing the anchor bolt into the bore 10, the head portion 2 is inserted into a socket portion of the socket wrench 22 forming a hexagon socket head and held by a magnet 29 provided in this socket portion. Succeedingly, the shank 1 is inserted and screwd into the bores of the structural body 9 and an object 30 to be fastened thereto by a conventional manner of screwing. The socket portion is provided with a cylindrical portion or an edge of the opening thereof, which has a relatively large inside diameter and forms a space 31 by which the head portion 2 (in the figures, a flange formed immediately below the head portion) accommodated in the socket portion is prevented from contacting the surface of the object 30. Accordingly, when the embedding of the anchor bolt is almost complete, the head portion 2 is detached from the magnet 29 and the socket portion and located in the space 31 by the procession of the shank 1 still rotating. Consequently, the socket wrench 22 starts racing, and the drive force for the anchor bolt is cut off, thus evading failure in tapping due to excessive torque.

Naturally, the present invention is not limited to the above types of embodiment. The invention may be variously modified or changed on the basis of the spirit of the invention without departing from the scope defined by the appended claims.

What is claimed is:

1. An anchor bolt comprising a shank for being screwed into a bore formed in a structural body made of concrete and the like, a head portion for rotating said shank, and a screw portion provided along said shank and including a screw thread as an constituent thereof, said screw thread having an entering flank facing the screwing direction, a trailing flank facing the unscrewing direction and a plurality of notches on a crest of said screw thread, wherein:

said screw thread 4 has an angle of inclination $\beta$ from said trailing flank 7 to an axis L of said shank being smaller than the angle of inclination $\alpha$ from said entering flank to said axis L; and a root 5 of the thread formed along said shank between turns of said screw thread is provided with a carrying portion 11 formed in a position immediately adjacent to said trailing flank that tapers in the unscrewing direction, and a tapered surface which gradually increases in diameter from said carrying portion to a root portion X of the entering flank of a following turn of the screw thread.

2. An anchor bolt according to claim 1, wherein said angle of inclination $\alpha$ of said entering flank is approx. 140 degrees, and said angle of inclination $\beta$ of said trailing flank is approx. 105 degrees.

3. An anchor bolt according to claim 1, wherein a point of intersection Z of said carrying portion and said tapered surface is in a position that is displaced from a middle point C of a line X - Y connecting said root portion X of said entering flank with a root portion Y of said trailing flank in the screwing direction F.

4. An anchor bolt according to claim 1, wherein said notches of said screw thread are formed of a shallow U-shape.

5. An anchor bolt according to claim 1, wherein said angle of inclination $\beta$ of said trailing flank 7 is 90 degrees.

6. An anchor arrangement having a structural body that is made of concrete or like material with a bore formed therein and an anchor bolt, said anchor bolt comprising a shank screwed into the structural body, a head portion for rotating said shank, and a screw portion provided along said shank and including a screw thread as an constituent thereof having an entering flank facing the screwing direction, a trailing flank facing the unscrewing direction and a plurality of notches on a crest of said screw thread, wherein:

said screw thread 4 has a crest diameter which is larger than an inside diameter of said bore, and a diameter of at least one of a root portion X of said entering flank 6 and a root portion Y of said trailing flank 7 being equal to said inside diameter of said bore 10 for constituting guide means for screwing said shank into said bore 10;

said entering flank 6 is defined by an angle of inclination $\alpha$ therefrom to an axis L of said shank, while said trailing flank 7 is defined by an angle of inclination $\beta$ therefrom to said axis L, said angle of inclination $\beta$ being smaller than said angle of inclination $\alpha$ for increasing a pull-out resistance of the trailing flank 7 relative to the structural body, while enabling the entering flank 6 to retain the thickness and strength of the screw thread; and a root 5 of the thread between turns of said screw thread is provided with a carrying portion 11 which decreases in diameter continuously from said root portion Y and has a diameter which is smaller than said inside diameter of said bore, and a tapered surface 12 which gradually increases in diameter from said carrying portion to the root portion X of the entering flank of a following turn of the screw thread.

7. An anchor bolt according to claim 6, wherein said angle of inclination $\alpha$ of said entering flank is approx. 140 degrees, and said angle of inclination $\beta$ of said trailing flank is approx. 105 degrees.

8. An anchor bolt according to claim 6, wherein a point of intersection Z of said carrying portion and said tapered surface is in a position that is displaced from a middle point C of a line X-Y connecting said root portion X of said entering flank with said root portion Y of said trailing flank in the screwing direction F.

9. An anchor bolt according to claim 6, wherein said notches of said screw thread are formed of a shallow U-shape.

10. An anchor bolt according to claim 6, wherein said angle of inclination $\beta$ of said trailing flank 7 is 90 degrees.

* * * * *